March 3, 1959          A. THOMAS          2,876,368

NUCLEAR ELECTRET BATTERY

Filed April 6, 1953

RADIOISOTOPE CHEMICALLY COMBINED WITH ELECTRET MATERIAL

INVENTOR
ALEXANDER THOMAS
BY *Spencer E. Olson*
ATTORNEY

United States Patent Office
2,876,368
Patented Mar. 3, 1959

2,876,368

NUCLEAR ELECTRET BATTERY

Alexander Thomas, Weston, Mass., assignor to Tracerlab, Inc., Boston, Mass., a corporation of Massachusetts Application April 6, 1953, Serial No. 346,915

16 Claims. (Cl. 310—3)

This invention relates generally to the generation of electrical energy and more particularly to unique methods of and means for utilizing the electrical energy of nuclear reactions to convert an electret from an electrostatic device to an electrodynamic current-producing device.

Heretofore, two general approaches have been made toward the direct utilization of the energy provided by certain nuclear reactions for the production of electric current, i. e., a source of battery power. One approach has been extensively investigated by Ernest G. Linder as exemplified by United States Patents 2,517,120; 2,527,945; 2,548,225; 2,555,143 and 2,598,925, which may be designated as the "direct" type of nuclear battery wherein current is produced by utilizing the directionality of $\alpha$ or $\beta$ rays between the collecting electrodes. In essence, the battery comprises a radioactive source and one or more collector electrodes for collecting charged particle rays from the source, and means for applying the resultant unidirectional potential between the source and collector electrodes to a load. The efficiency of this type of battery is low at low voltages, and with presently known radioisotopes can have reasonable efficiency only in the region between about 5 and 500 kilovolts. This being an unreasonable voltage for most applications where the relatively small currents generated can be used, batteries of this type have limited usefulness.

The other type of nuclear battery which has been investigated utilizes the field produced by the contact potential difference between two electrodes (formed of dissimilar metals) to collect the ionization produced by $\alpha$ or $\beta$ radiations in a gas separating the electrodes. The maximum efficiency of this type of nuclear battery is the ratio of the contact potential difference (in volts) to twice the average energy (in electron volts) lost by the radiation per ion pair formed. This maximum efficiency, based upon known constants among the metallic elements, is about 5%. Moreover, since the maximum contact potential difference among the elements is only 3 volts, a large number of cells are required to obtain even several hundred volts of electromotive force in the gaseous type of nuclear battery.

The present invention contemplates the incorporation of a radioactive source in an electret to make the electret a current producing device instead of an inherently electrostatic device.

Among the objects of the invention are to provide an improved method and means for generating electrical energy in response to nuclear reactions. Another object is to provide an efficient method for utilizing the electrical energy in nuclear reactions to generate reasonable currents over a useable voltage range. An additional object of the invention is to provide a method for releasing the static energy of an electret to generate an electric current. A still further object of the invention is to provide a current source of relatively high voltage for its volume. Yet another object is to provide improved methods and means for utilizing the combined electrical energies of an electret and a nuclear reaction to produce an electrical current.

These and other objects of the invention will become apparent from the following detailed description when considered with the accompanying drawings wherein like reference characters are applied to like elements in the several figures and in which.

The term "electret" was coined by Oliver Heaviside to denote a permanently electrified substance exhibiting electrical charges of opposite sign at its extremities. Since the first electret was prepared about thirty years ago, many investigators have sought to measure and explain the characteristics of the device. An article entitled "The Electret" by F. Gutmann, appearing in Reviews of Modern Physics, vol. 20, No. 3, July 1948, summarizes the observations made and theories evolved during this period. The materials which exhibit electret properties cannot be classified as definite nor pure compounds, and may consist of any of the plastics such as polymerized methyl methacrylate, styrene, tetrafluorethylene, polyvinyl acetate, cellulose derivatives, or a mixture of these. It may be a wax or a mixture of different waxes, and indeed, the first electret that was ever prepared consisted of equal parts of carnauba wax and resin with the addition of some beeswax. The general requirements of the material are that it be an insulator at ordinary temperatures and that it is characterized by a high dipole moment.

Figure 1:
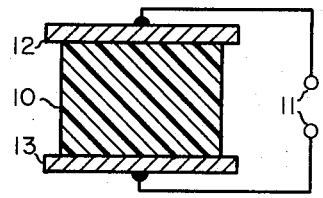
Fig. 1 is a schematic diagram of a conventional electret illustrating its mode of manufacture.

Referring to Fig. 1, the usual method of preparation is to subject the material 10 in a liquid or a molten state to a unidirectional field of 1–30 kilovolts/cm. by applying a suitable direct current voltage across terminals 11 connected to electrodes 12 and 13. The electrodes are in contact with the material 10, and current flows through the base material during preparation. As the material is solidified by cooling, polymerization, or completion of a chemical reaction, the current diminishes leaving a certain proportion of the dipoles oriented by the original directional ionic flow. Other conceivable methods of preparation of electrets include crystallization, superposition of oriented monomolecular layers, or mechanical stretching. However prepared, the material exhibits a strong charge of one polarity on one face, and a charge of opposite polarity on the other face. The electret is in many respects the exact counterpart of a permanent magnet. For example, if an electret is cut between its "poles," it yields two complete electrets, and if a surface layer is removed, the remaining body remains an electret. Moreover, for permanent maintenance of its charge, it must be kept with its faces short-circuited, exactly as a magnet must be kept with a soft iron keeper.

Figure 2:
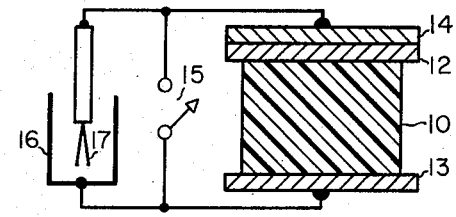
Figs. 2 and 3 are schematic diagrams illustrating a conventional demonstration of the properties of the electret.
Figure 3:
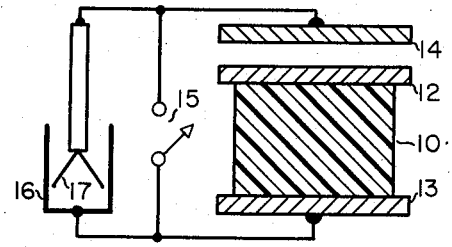

The conventional set-up for demonstrating the properties of the electret is depicted in Figs. 2 and 3 wherein the conventional electret 10 having plate electrodes 12 and 13 is equipped with an additional conducting plate electrode 14 in contact with the upper electrode 12. Connected across electrodes 14 and 13 is a "keeper" switch 15 and an electroscope 16. With switch 15 initially closed, there is no deflection of the leaves 17 of the electroscope. Upon opening switch 15, again no deflection of the electroscope leaves is observed.

If now the plate 14 is withdrawn from plate 12 as shown in Fig. 3, the surface charge Q on plate 12 represented by the field produced by the oriented dipoles within the electret of Fig. 2, is shared by the condenser 14—12 in series with condenser 12—13. The leaves of the electroscope diverge is proportion to the ratio of the electret surface charge Q to the effective capacity of condenser 14—12 in series with condenser 12—13. It is thus seen that the conventional electret is not a current source, but merely a latent source of electric field. In order to produce electrical power (in the demonstration, to deflect the leaves of the electroscope) work must be done against this field (in this case, by separating plate 14 from plate 12). A further analogy, therefore, between an electret and a permanent magnet, is that motion must be supplied for it to generate electrical power.

Figure 4:
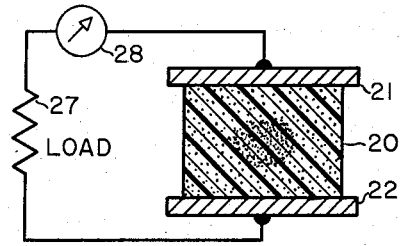
Fig. 4 is a schematic diagram of a preferred embodiment of the invention including a utilization circuit.
Figure 8:
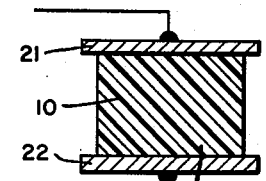

The present invention contemplates the modification of a conventional electret in a manner to "trigger" or controllably release the energy stored in the electret to convert the device from one that is electrostatic in nature to one that is electrodynamic. Referring to Fig. 4, the electret battery constructed in accordance with the present invention includes a conventional oriented electret 20 formed of one or more of the plastics or waxes normally used for this purpose, to which reference has been made hereinabove, into which is incorporated a radioactive isotope, represented by dots randomly distributed throughout the block 20. Suitable isotopes are tritium, carbon-14, krypton-85 or strontium-90, but it is to be understood that this is an illustrative list only, and should not be construed as limiting. For ease of preparation of the electret, the isotope is preferably uniformly mixed with the electret material when in the molten state, whereby upon polarization by application of a unidirectional field and subsequent cooling, the isotope is uniformly distributed throughout the volume of the electret member 20. Uniform disposition may be accomplished physically as a dispersion or solution, or as part of the chemical structure of the electret material, as part of the chemical structure of the constituent having the high dipole moment, or a combination of these. For example, if styrene is used, a portion of the hydrogen content thereof may be replaced by radioactive tritium, whereby the isotope is chemically combined in the styrene molecule as diagrammatically illustrated in Fig. 8.

Figure 5:
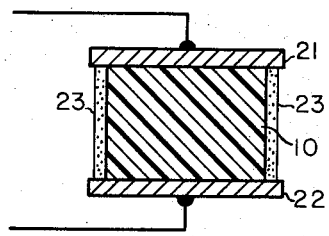
Figs. 5, 6, 7, 8 and 9 are schematic diagrams illustrating further embodiments of the invention.
Figure 6:
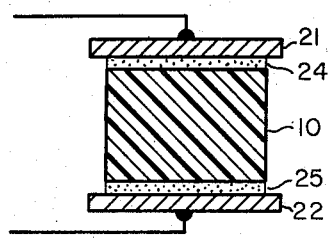
Figure 9:
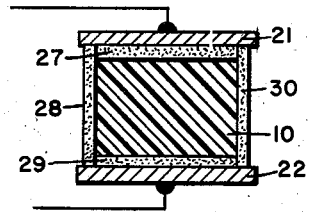

Alternatively, the radioisotope may be placed on the surface of the block of electret material at the boundaries thereof perpendicular to plate electrodes 21 and 22, as indicated by numeral 23 in Fig. 5, on the surfaces of the electret where electrodes 21 and 22 contact the element, illustrated in Fig. 6 as layers 24 and 25, or both, illustrated in Fig. 9 as layers 27, 28, 29 and 30. In these cases, the electret 10 is conventionally prepared, and the isotope, depending upon its available form, is placed in intimate contact therewith, as by adhesive or evaporation.

Figure 7:
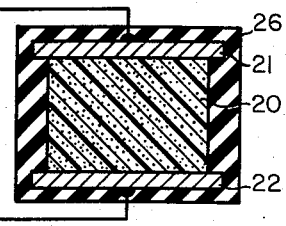

In other cases, non-uniform distribution of the radioactivity may be desirable. For example, the radioactive material may be distributed non-uniformly at the center of the electret, represented by the concentration of dots near the center of the electret of Fig. 4, to minimize ionization of the air or other gas surrounding the exposed surfaces of the electret and thus prevent serious electrical leakage across the device which might result from such ionization. Alternatively, the entire battery, having the activity uniformly distributed therein, may be "plotted" in a suitable low leakage non-radioactive dielectric 26 to minimize leakage, as illustrated in Fig. 7.

A load 27 is connected between the collector electrodes 21 and 22, and a galvanometer 28 in series therewith indicates the current generated by the electret.

In operation, the energy of disintegration of the radioactive isotope is expended in the electret material to produce ionization, electromagnetic radiation, and motion of the atoms and molecules of which the electret is composed. The ultimate degradation of this energy from recombination of ions or absorption of the electromagnetic energy also results in motion of the constituents of the electret and is manifested as heat. The energy stored in the electret during preparation, however, is represented by the difference in the energy of the oriented dipole state and the energy of the random disoriented state. The radioactive isotope, incorporated in the electret in any one of the above-mentioned ways, functions to release this stored energy by one or more of several processes:

(a) The energy of disintegration of the radioisotope produces ions which by virtue of their mobility in the electret field, produce an internal and consequently an external current.

(b) The disintegrations physically or chemically break down the domains of dipole moment so that its charge is delivered to the circuit by electrical induction.

(c) The radiations from the isotope physically or chemically break down the domains of dipole moment so that the natural return to the random energy state is accelerated by the radiation, during the process releasing the stored up electrical energy of the electret.

(d) The radiation may break down the physical or chemical structure of the electret so that a current is produced by a change in its dielectric constant.

(e) Finally, the effect of the isotope may accelerate the return to the disoriented state without physical or chemical deterioration by heat produced by the absorbed radiation and its effect on the mobility of the molecules.

The foregoing procedures are very likely interrelated, and are presented as being illustrative of the possible explanations for the phenomena that result in the current producing capabilities of a radioactive electret.

Many advantages of a battery of this type will have become apparent from the foregoing description. For example, for currents of the order of $10^{-9}$ ampere or more produced by the Linder method, the cost of the isotope at present-day prices represents a substantial proportion of the total cost. By utilizing the present indirect method of generating electrical energy by efficiently using the isotope to "trigger" the release of electrical energy already stored in the electret is considerably less costly. Moreover, a single conventional electret normally provides voltages in the range of 50–1000 volts, so that in this voltage range, the construction of a battery in accordance with the present invention is much simpler than the stacking of large numbers of electrode pairs as is necessary to obtain suitable voltage with electrolytic or gaseous nuclear batteries. Thus, the size and weight of the present battery for given current and voltage requirements are much smaller than batteries of the prior art. Finally, since the life of the present battery is determined by a combination of the characteristic decay of the electret and the natural half-life of the isotope used, the life may be made longer than that of conventional electrolytic batteries.

While the invention has been described and the novel features pointed out as applied to a preferred embodiment, it will be understood that various omissions and substitutions may be made by those skilled in the art without departing from the spirit of the invention. It is the intention, therefore, to be limited only as indicated by the scope of the appended claims.

What is claimed is:

1. Apparatus for generating electrical energy comprising an electret exhibiting a static electric field, a radioisotope integrally combined with said electret, and means connected to said electret for deriving a load current therefrom.

2. Apparatus in accordance with claim 1 wherein said radioisotope is uniformly distributed throughout said electret.

3. Apparatus in accordance with claim 1 wherein said radioisotope is non-uniformly distributed at the center of the electret.

4. Apparatus in accordance with claim 1 wherein said radioisotope is affixed to an exterior surface of said electret.

5. Apparatus for generating electrical energy comprising an electret having parallel plate electrodes across which there appears a static voltage, a radioisotope integrally combined with said electret arranged such that radiations therefrom are absorbed in the material of said electret, and means connected to said electrodes for deriving a load current at said voltage.

6. Apparatus in accordance with claim 5 wherein said radioisotope is uniformly disposed in the electret material.

7. Apparatus in accordance with claim 6, and a covering of insulating material surrounding said electret.

8. Apparatus in accordance with claim 5 wherein said radioisotope is chemically combined with a constituent of the electret material.

9. Apparatus in accordance with claim 5 wherein said radioisotope is non-uniformly disposed in the electret.

10. Apparatus in accordance with claim 5 wherein said radioisotope is affixed to the surface of said electret at the boundaries thereof perpendicular to said electrodes.

11. Apparatus in accordance with claim 5 wherein said radioisotope is affixed on the surfaces of said electret to which said electrodes make contact.

12. Apparatus in accordance with claim 5 wherein said radioisotope is affixed on all external surfaces of said electret.

13. Apparatus in accordance with claim 5 wherein said radioisotope is disposed at the center of said electret.

14. Apparatus for generating electrical energy comprising, in combination, an electret having a polarized dipole orientation and a radioactive material integrally combined with said electret arranged such that the energy of disintegration of said radioactive material is absorbed within the electret, the absorption by said electret of said energy of disintegration causing alteration of its dipole orientation and the generation of an electrical current.

15. Apparatus for generating electrical energy comprising an electret, electrically conducting electrodes permanently in contact with the opposite surfaces of the electret, a radioactive material integrally combined with said electret arranged such that the energy of disintegration of said radioactive material is absorbed by said electret, the energy thus absorbed causing alteration of the dipole orientation within said electret and the generation of an electromotive force capable of producing a continuous electrical current, and a utilization circuit connected to said electrodes for deriving a load current at said electromotive force.

16. A battery comprising a pair of electrodes disposed in spaced relationship, an electret disposed between said electrodes and having oppositely charged surfaces conductively connected to the respective electrodes, a quantity of radioactive material integrally combined with said electret such that radiations therefrom are absorbed in said electret, and a utilization circuit connected to said electrodes for deriving a current caused by the discharge of said electret by virtue of the absorption of said radiations.

References Cited in the file of this patent

UNITED STATES PATENTS

| | | |
|---|---|---|
| 2,604,596 | Ahearn | July 22, 1952 |
| 2,631,246 | Christian | Mar. 10, 1953 |
| 2,661,431 | Linder | Dec. 1, 1953 |
| 2,663,802 | Ohmart | Dec. 22, 1953 |

OTHER REFERENCES

"A New Electronic Battery," in The Electrician, vol. 10, page 497, Oct. 31, 1924.

"Electrets," by Andrew Gemant, published in Physics Today, March 1949, pages 8–13. (P. O. Library.)